US011112541B2

(12) United States Patent
Tobiason

(10) Patent No.: US 11,112,541 B2
(45) Date of Patent: Sep. 7, 2021

(54) TUNABLE ACOUSTIC GRADIENT LENS SYSTEM WITH REFLECTIVE CONFIGURATION AND INCREASED POWER

(71) Applicant: Mitutoyo Corporation, Kanagawa-ken (JP)

(72) Inventor: Joseph Daniel Tobiason, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 103 days.

(21) Appl. No.: 16/723,184

(22) Filed: Dec. 20, 2019

(65) Prior Publication Data

US 2021/0191000 A1 Jun. 24, 2021

(51) Int. Cl.
*G02B 3/14* (2006.01)
*G03B 17/12* (2021.01)
*G02B 3/00* (2006.01)

(52) U.S. Cl.
CPC ............. *G02B 3/14* (2013.01); *G02B 3/0087* (2013.01); *G03B 17/12* (2013.01)

(58) Field of Classification Search
CPC ......... G02B 3/14; G02B 3/0087; G03B 17/12
See application file for complete search history.

(56) References Cited

U.S. PATENT DOCUMENTS

| 7,627,162 | B2 | 12/2009 | Blanford et al. |
| 8,194,307 | B2 | 6/2012 | Arnold et al. |
| 9,143,674 | B2 | 9/2015 | Gladnick |
| 9,213,175 | B2 | 12/2015 | Arnold |
| 9,256,009 | B2 | 2/2016 | Theriault et al. |
| 9,726,876 | B2 | 8/2017 | Bryll |
| 9,736,355 | B1 | 8/2017 | Bryll |
| 9,774,765 | B2 | 9/2017 | Bryll et al. |
| 9,830,694 | B2 | 11/2017 | Bryll |
| 9,930,243 | B2 | 3/2018 | Gladnick et al. |
| 9,983,459 | B2 | 5/2018 | Arnold |

(Continued)

OTHER PUBLICATIONS

Andreas Groschl, "Improvements of a high-speed focus distance modulated fibrecoupled confocal sensor for nanocoordinate measuring systems," Sensoren und Messsysteme,Jun. 26-27, 2018, in Nürnberg pp. 98-100).*

(Continued)

*Primary Examiner* — Omar S Ismail
(74) *Attorney, Agent, or Firm* — Seed IP Law Group LLP

(57) ABSTRACT

A tunable acoustic gradient (TAG) lens includes a lens casing in which a controllable acoustic wave generating element is arranged and that surrounds a casing cavity in which an operational volume of a refractive fluid is contained. The lens casing includes a first case end portion comprising a window mounted along an optical path, and a second case end portion comprising a mirror mounted along the optical path. The TAG lens is configured to enable light to pass through the window of the TAG lens to enter the TAG lens and make a first pass through the operational volume of the refractive fluid and be reflected by the mirror of the TAG lens and make a second pass back through the operational volume of the refractive fluid and pass back out through the window of the TAG lens to exit the TAG lens and continue along the optical path.

20 Claims, 5 Drawing Sheets

(56) References Cited

U.S. PATENT DOCUMENTS

| | | |
|---|---|---|
| 10,101,572 B2 | 10/2018 | Bryll et al. |
| 10,151,962 B2 | 12/2018 | Gladnick et al. |
| 10,178,321 B2 | 1/2019 | Emtman et al. |
| 10,520,650 B2 | 12/2019 | Freerksen et al. |
| 2002/0153422 A1* | 10/2002 | Tsikos ............... G06K 7/10742 235/454 |
| 2004/0004723 A1* | 1/2004 | Seko ................... G06F 3/03545 356/498 |
| 2006/0211802 A1 | 9/2006 | Asgari |
| 2007/0188855 A1* | 8/2007 | Shishkov ................. G01J 3/02 359/362 |
| 2008/0128506 A1* | 6/2008 | Tsikos ............... G06K 7/10732 235/462.42 |
| 2009/0054791 A1* | 2/2009 | Flusberg ............. A61B 5/0059 600/478 |
| 2010/0137990 A1 | 6/2010 | Apatsidis et al. |
| 2013/0070249 A1* | 3/2013 | Choi ................... A61B 5/0066 356/445 |
| 2016/0025903 A1 | 1/2016 | Arnold |
| 2017/0052425 A1 | 2/2017 | Arnold |
| 2017/0078549 A1 | 3/2017 | Emtman et al. |
| 2017/0329201 A1* | 11/2017 | Arnold ................ G02B 3/0087 |
| 2018/0180773 A1 | 6/2018 | Usami et al. |
| 2018/0303573 A1* | 10/2018 | Trulson .............. G01N 21/6458 |
| 2019/0369300 A1 | 12/2019 | Freerksen et al. |

OTHER PUBLICATIONS

Nicolas Olivier,"Two-photon microscopy with simultaneous standard and extended depth of field using a tunable acoustic gradient-index lens," Optics Letters. vol. 34, No. 11,Jun. 1, 2009,pp. 1684-1686.*

Freerksen et al., "External Reservoir Configuration for Tunable Acoustic Gradient Lens," U.S. Appl. No. 16/000,319, filed Jun. 5, 2018, 46 pages.

Mermillod-Blondin et al., "High-speed varifocal imaging with a tunable acoustic gradient index of refraction lens," *Optics Letters* (33)18, Sep. 15, 2008, pp. 2146-2148. (3 pages).

Watson et al., "Tunable Acoustic Gradient Lens With Axial Compliance Portion," U.S. Appl. No. 16/227,561, filed Dec. 20, 2018, 50 pages.

* cited by examiner

US 11,112,541 B2

TUNABLE ACOUSTIC GRADIENT LENS SYSTEM WITH REFLECTIVE CONFIGURATION AND INCREASED POWER

BACKGROUND

Technical Field

This disclosure relates to tunable acoustic gradient lenses, and more particularly to the use of tunable acoustic gradient lenses in variable focal length lens systems used for inspection and dimensional metrology.

Description of the Related Art

Various types of multi-lens variable focal length (VFL) optical systems may be utilized for observation and precision measurement of surface heights and may be included in a microscope and/or precision machine vision inspection system, for example as disclosed in U.S. Pat. No. 9,143,674, which is hereby incorporated herein by reference in its entirety. Briefly, a VFL lens allows acquisition of images at controllable focal lengths. One type of known VFL lens is a tunable acoustic gradient ("TAG") lens that creates a lensing effect using sound waves in a fluid medium. The sound waves may be created by application of an electrical field at a TAG lens resonant frequency to a vibrating member (e.g., a piezoelectric tube) surrounding the fluid medium to create a time-varying density and index of refraction profile in the lens's fluid, which modulates its optical power and thereby the focal length or effective focus position of the vision system. A TAG lens may be used to periodically modulate a focus position at a resonant frequency of up to several hundred kHz, i.e., at a high speed. Such a lens may be understood in greater detail by the teachings in the article, "High speed varifocal imaging with a tunable acoustic gradient index of refraction lens" (*Optics Letters*, Vol. 33, No. 18, Sep. 15, 2008), and in U.S. Pat. Nos. 8,194,307, 9,213,175 and 9,256,009, each of which is hereby incorporated herein by reference in its entirety. Tunable acoustic gradient index lenses and related controllable signal generators are available, for example, from Mitutoyo Corporation, of Kawasaki, Japan.

Limitations in the optical performance (e.g., focus range) of a TAG lens may correspondingly limit the performance of a system that includes the TAG lens. In particular, in metrology systems such limitations may be relatively critical with regard to the system's operational capabilities (e.g., range) for performing certain inspection and dimensional metrology functions. With regard to such applications, a configuration that can provide improvements with regard to the optical performance (e.g., focus range) of a TAG lens would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A tunable acoustic gradient (TAG) lens system is provided including a TAG lens, a TAG lens control interface, a camera, an objective lens, and a camera control interface. The TAG lens control interface provides a control signal that controls a drive signal of the TAG lens to periodically modulate optical power of the TAG lens over a range of optical powers that occur at respective phase timings within the periodic modulation. The camera receives light transmitted along an imaging optical path during an image exposure and provides a corresponding camera image. The imaging optical path includes the TAG lens. The objective lens inputs workpiece light arising from a workpiece during a workpiece image exposure and transmits the workpiece light along the imaging optical path to the TAG lens, which provides workpiece light to the camera during the workpiece image exposure to provide a workpiece image in a corresponding camera image. An effective focus position in front of the objective lens during a workpiece image exposure corresponds to the optical power of the TAG lens during that workpiece image exposure. A control signal is provided for controlling an image exposure timing used for a camera image.

As will be described in more detail below, the TAG lens as disclosed herein may include a lens casing with a mirror on one end and a window on the other end (e.g., as compared to previous TAG lenses which had a window on each end). The TAG lens as disclosed herein includes the lens casing as surrounding a casing cavity, a controllable acoustic wave generating element, and a refractive fluid. An operational volume of the refractive fluid is contained in the casing cavity and the controllable acoustic wave generating element is arranged inside the lens casing around an optical path that passes through the operational volume, and an axial direction of the TAG lens is defined as parallel to an optical axis of the optical path. The operational volume of the refractive fluid is capable of changing its refractive index along the optical path in response to application of an acoustic wave by the acoustic wave generating element, in accordance with which the TAG lens is controlled to provide a periodically modulated optical power variation for the TAG lens when a periodic drive signal is applied to the acoustic wave generating element. The lens casing includes a case wall portion that extends generally along the axial direction, a first case end portion that extends generally transverse to the axial direction and comprises a centrally located window configuration comprising a window mounted along the optical path in a window mounting portion and a case end rim portion that is at least partially aligned with and sealed to the case wall portion, and a second case end portion that extends generally transverse to the axial direction and comprises a centrally located mirror configuration comprising a mirror mounted along the optical path in a mirror mounting portion and a case end rim portion that is at least partially aligned with and sealed to the case wall portion. The TAG lens is configured to enable workpiece light from the objective lens to pass through the window of the TAG lens to enter the TAG lens and make a first pass through the operational volume of the refractive fluid and be reflected by the mirror of the TAG lens and make a second pass back through the operational volume of the refractive fluid and pass back out through the window of the TAG lens to exit the TAG lens and continue along the optical path to the camera.

In some implementations, the modulation of the optical power of the TAG lens results in a range of effective focus positions that occur in front of the objective lens during the modulation, and for which the range is larger due to the first and second passes through the operational volume of the refractive fluid of the TAG lens as compared to a configuration with only a single pass through the operational volume of the refractive fluid of the TAG lens. In various implementations, the range is bound by a maximum effective focus position (e.g., as corresponding to a maximum optical power of the TAG lens in combination with the objective lens) and a minimum effective focus position (e.g., as corresponding to a maximum negative optical power of the TAG lens in combination with the objective lens) and for which the maximum effective focus position may be closer to the objective lens and the minimum effective focus position may be further from the objective lens due to the first and second passes through the operational volume of the refractive fluid of the TAG lens as compared to a configuration with only a single pass through the operational volume of the refractive fluid of the TAG lens. In some implementations, such features may correspond to an increased effective optical power of the TAG lens, for which the effective optical power and the corresponding range of focus positions may each be increased (e.g., in some instances approximately doubled) due to the first and second passes through the operational volume of the refractive fluid of the TAG lens as compared to a configuration with only a single pass through the operational volume of the refractive fluid of the TAG lens.

In various implementations, the TAG lens system further includes a beam splitter arranged in the optical path between the objective lens and the TAG lens. The beam splitter includes a reflecting surface and at least some of the workpiece light is directed toward the TAG lens by the beam splitter. The TAG lens system may include a monitoring portion that receives a portion of the workpiece light that travels from the field lens through the beam splitter. The monitoring portion outputs a signal indicative of a property of the portion of the workpiece light that is received by the monitoring portion.

In various implementations, a nonpolarizing beam splitter can be used with any light source to direct a portion of the workpiece light toward the TAG lens, and to direct another portion of the workpiece light to a monitoring portion, and to direct the returning portion of the workpiece light as reflected back from the TAG lens to the camera, with a total efficiency relative to workpiece light of up to 25%. In other various implementations, a larger total efficiency may be obtained through utilization of a polarizing beam splitter and a quarter-wave plate. More specifically, the beam splitter may be a polarizing beam splitter and there may be a quarter-wave plate arranged in the optical path between the beam splitter and the TAG lens, where the quarter-wave plate may alter a polarization state of at least some of the workpiece light that is directed by the polarizing beam splitter toward the TAG lens and again upon its return from the TAG lens to allow a total efficiency of up to 50% for unpolarized light (e.g., a 50% loss upon a first pass through the polarized beam splitter, but down to a 0% loss upon a second pass through the polarized beam splitter, after a return from the TAG lens).

In other various implementations, depending on the workpiece and required light source, a yet larger total efficiency may be obtained through utilization of a polarizing beam splitter, a quarter-wave plate and a polarized light source. More specifically, a configuration including a polarizing beam splitter and quarter wave plate as described above may also include a polarized light source (e.g., a polarized laser) that emits a beam of light that returns from the workpiece resulting in the workpiece light, which then may be primarily polarized. The system may further include polarization changing optics (e.g., a half-wave plate), that may be arranged in the imaging optical path between the objective lens and the beam splitter. The polarization changing optics may shift a polarization direction of the workpiece light that passes through the objective lens. One or more of the laser and the polarization changing optics may be oriented so as to select the ratio of the portion of workpiece light that is directed toward the TAG lens (up to 100%) and the portion of the workpiece light that is directed toward the monitoring portion, for a total efficiency of workpiece light to the camera of up to 100% (e.g., if 0% is directed to the monitoring portion then up to 100% may be directed to the TAG lens and back to the camera, and if 5% is directed to the monitoring portion then up to 95% may be directed to the TAG lens and back to the camera, etc.)

In some implementations, the lens casing includes a mounting surface for mounting the TAG lens in the TAG lens system that is proximate to the mirror.

In some implementations, the lens casing includes a mounting surface for mounting the TAG lens in the TAG lens system, wherein the mounting surface is proximate to the window. The workpiece light may be in a form of a beam and the TAG lens, in operation, may add a phase delay to the beam through reflection off the TAG lens mirror.

In some implementations, the TAG lens system includes an illumination control interface which provides a control signal for controlling one or more of a power level and an illumination timing of an illumination source that outputs light. At least some of the light output by the illumination source is returned from (e.g., reflected from or transmitted through) the workpiece resulting in the workpiece light. In some implementations, the illumination may be coaxial with the imaging (e.g., as may help preserve polarization and as may have certain advantages in an implementation utilizing a polarizing beam splitter, etc.)

In some implementations, the TAG lens system includes a motion control system that moves the workpiece relative to the optical imaging system.

In addition, a method for operating a tunable acoustic gradient (TAG) lens system which includes a TAG lens is provided. A control signal is provided that controls a drive signal of the TAG lens to periodically modulate optical power of the TAG lens over a range of optical powers that occur at respective phase timings within the periodic modulation. A camera is operated to receive light transmitted along an imaging optical path during an image exposure and a corresponding camera image is provided. The imaging optical path includes the TAG lens. The system includes an objective lens that inputs workpiece light arising from a workpiece during a workpiece image exposure and transmits the workpiece light along the imaging optical path to the TAG lens which provides workpiece light to the camera during the workpiece image exposure, to provide a workpiece image in a corresponding camera image. An effective focus position in front of the objective lens during a workpiece image exposure corresponds to the optical power of the TAG lens during that workpiece image exposure. A control signal is provided for controlling an image exposure timing used for a camera image. The TAG lens includes a controllable acoustic wave generating element, a refractive fluid, and a lens casing surrounding a casing cavity. An operational volume of the refractive fluid is contained in the casing cavity and the controllable acoustic wave generating element is arranged inside the lens casing around an optical path that passes through the operational volume, and an axial direction of the TAG lens is defined as parallel to an optical axis of the optical path. The operational volume of the refractive fluid is capable of changing its refractive index along the optical path in response to application of an acoustic wave by the acoustic wave generating element, in accordance with which the TAG lens is controlled to provide a periodically modulated optical power variation for the TAG lens when a periodic drive signal is applied to the acoustic wave generating element. The lens casing includes a case wall portion that extends generally along the axial direction, a first case end portion that extends generally transverse to the axial direction and comprises a centrally located window configuration comprising a window mounted along the optical path in a window mounting portion and a case end rim portion that is at least partially aligned with and sealed to the case wall portion, and a second case end portion that extends generally transverse to the axial direction and comprises a centrally located mirror configuration comprising a mirror mounted along the optical path in a mirror mounting portion and a case end rim portion that is at least partially aligned with and sealed to the case wall portion. Workpiece light from the objective lens passes through the window of the TAG lens to enter the TAG lens and makes a first pass through the operational volume of the refractive fluid and is reflected by the mirror of the TAG lens and makes a second pass back through the operational volume of the refractive fluid and passes back out through the window of the TAG lens to exit the TAG lens and continue along the optical path to the camera.

In some implementations, a control signal is provided for controlling one or more of a power level and an illumination timing of an illumination source that outputs light. At least some of the light output by the illumination source is returned from the workpiece (e.g., as reflected from the workpiece and/or scattered from the workpiece, or transmitted through the workpiece etc.) resulting in the workpiece light.

DETAILED DESCRIPTION

Figure 1:
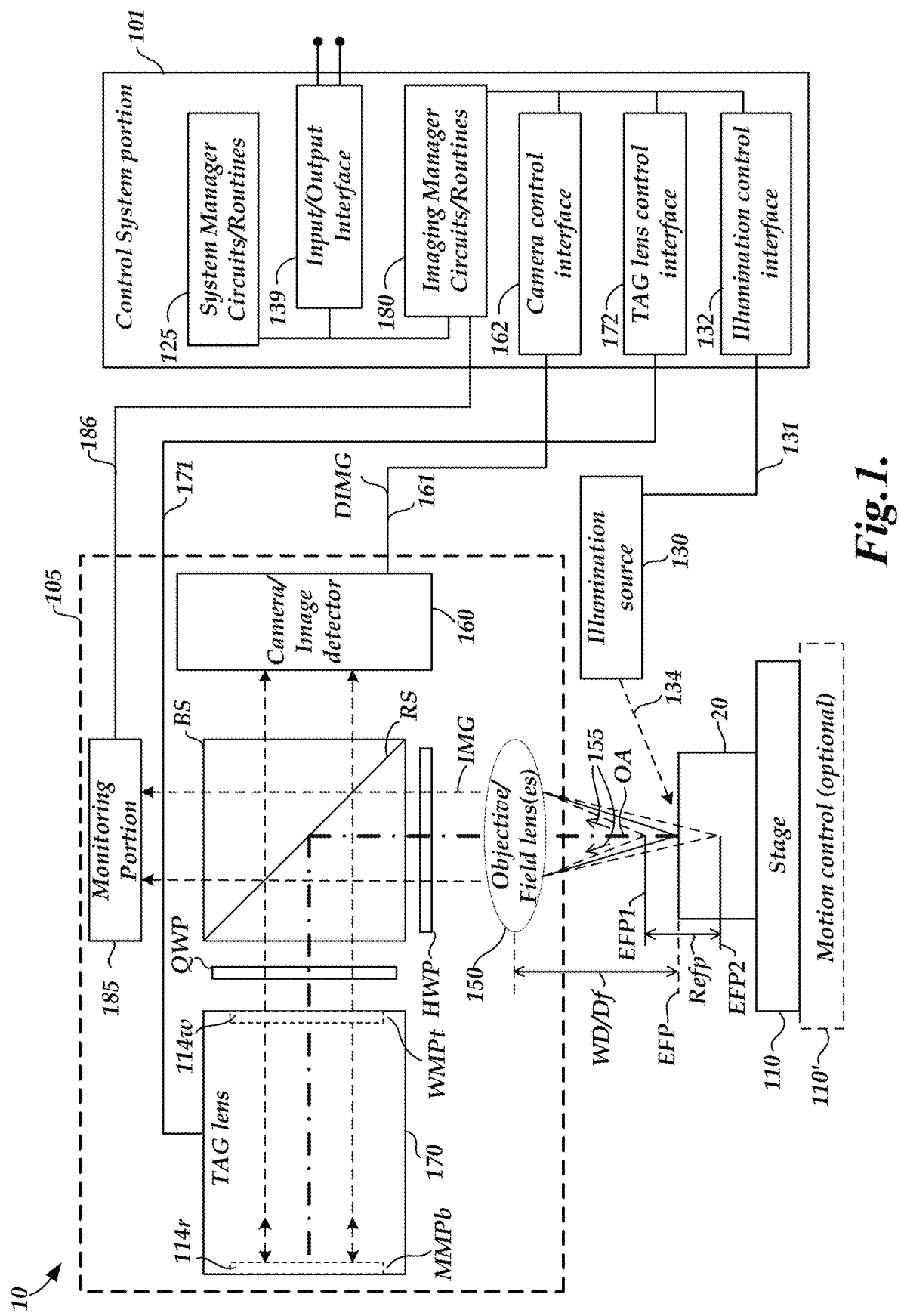
FIG. 1 is a block diagram of an optical imaging portion and a control system portion of an imaging/inspection system including a TAG lens with a reflective configuration.
Figure 2:
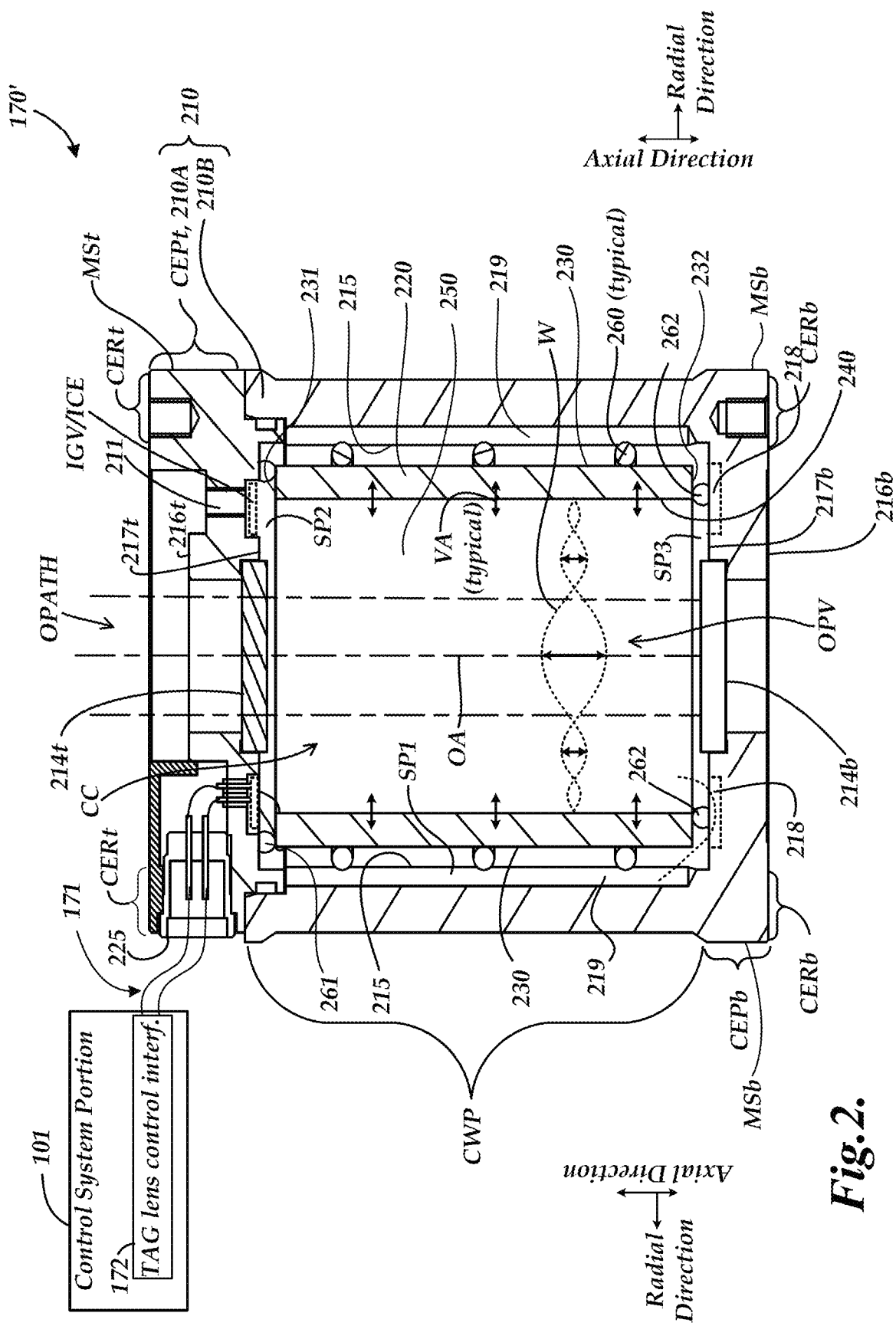
FIG. 2 is a diagram of a cross section of a TAG lens similar to that of FIG. 1, including a standing acoustic wave generated at resonance therein.

The description of FIGS. 1 and 2 in part provides a background regarding various operating principles and applications of a TAG lens used in a TAG lens system (e.g., which may be included as part of, or may be, a workpiece inspection system, a vision system, etc.) To supplement this background with more in-depth explanation and understanding, various aspects of such operating principles and applications are described in greater detail in the previously incorporated references, and in U.S. Pat. Nos. 9,930,243; 9,736,355; and 7,627,162, each of which is hereby incorporated herein by reference in its entirety.

FIG. 1 is a block diagram of a TAG lens system 10 (e.g., an imaging/inspection/vision system) including an optical imaging system 105, an illumination source 130, a workpiece stage 110 and a control system portion 101. In various implementations, the TAG lens system 10 may be adapted to a machine vision host system, or used as a standalone system, and may be operated according to principles disclosed herein and in the incorporated references. The TAG lens system 10, including the optical imaging system 105, the illumination source 130, and the workpiece stage 110, may generally be controlled by the control system portion 101 to image or inspect a workpiece 20.

The optical imaging system 105 includes an image detector 160 (e.g., a camera), one or more field lenses 150 (e.g., including an interchangeable objective lens), a beam splitter BS, and a TAG lens 170. The beam splitter BS is arranged in an optical path between the one or more field lenses 150 and the TAG lens 170. In some configurations (e.g., for any light source) the beam splitter BS is nonpolarizing, and for which a quarter-wave plate QWP and a half-wave plate HWP may not be included as a part of such configurations (e.g., with a total efficiency relative to workpiece light of up to 25%, with up to 50% of the light going to the monitoring portion 185).

In other configurations (e.g., with an unpolarized light source), the beam splitter BS is a polarizing beam splitter, with a quarter-wave plate QWP arranged in the optical path between the beam splitter BS and the TAG lens 170, wherein the quarter-wave plate QWP changes a polarization state of the light that double-passes through it as follows: The light 155 reflected by the reflective surface RS of the beam splitter BS becomes linear polarized and passes through the quarter-wave plate QWP before entering the window 114w of the TAG lens 170. The quarter-wave plate QWP converts the linearly polarized light into circularly polarized light. The light 155 that enters the window 114w travels through an operational volume of a refractive fluid inside the TAG lens 170 a first time (e.g., as part of a first pass through the operational volume of the refractive fluid) toward a mirror 114r, and is then reflected by the mirror 114r to travel back through the operational volume of the refractive fluid a second time (e.g., as part of a second pass through the operational volume of the refractive fluid) and exit back out through the window 114w. The light 155 then passes back through the quarter-wave plate QWP to become linearly polarized in an orthogonal direction to the previously linearly polarized light, and at least some of the light 155 passes through the beam splitter BS to arrive at the camera/image detector 160 (e.g., with a total efficiency relative to workpiece light of up to 50%, with up to 25% of the light going to the monitoring portion). A half-wave plate HWP may not be included as a part of such configurations.

In other configurations, the optical imaging system 105 includes a polarizing beam splitter BS and quarter wave plate QWP, and the illumination source 130 is a polarized light source (e.g., a laser) that emits a beam of polarized light. Such configurations may optionally include polarization changing optics such as the half-wave plate HWP arranged in the optical path between the one or more field lenses 150 (e.g., an objective lens) and the beam splitter BS, wherein the polarized light source 130 and/or the half-wave plate HWP (if included) is oriented to select the amount of a first portion of the workpiece imaging light 155 that is directed by the polarizing beam splitter BS towards the TAG lens 170 (i.e., the workpiece light 155 first entering the polarizing beam splitter BS is linearly polarized at a selected orientation that allows up to 100% efficient direction toward the TAG lens). It will be appreciated that such configurations may allow for sending a selectable amount of the light to the monitoring portion (e.g., 5% with a resulting 95% efficiency), as may be adjusted by adjusting the orientation of the polarized-light source 130 and/or the half-wave plate HWP. In various implementations, the total efficiency depends on the workpiece type and lighting type (e.g., as to how pure a polarization can be returned from the workpiece, etc.)

In general, as shown in FIG. 1, light 134 from the illumination source 130 illuminates the workpiece 20, and workpiece imaging light 155 (e.g., as returned from the workpiece 20) goes up through the field lens(es)/objective lens 150, (and optionally travels through the half-wave plate HWP if included in the configuration), and at least some of the light is reflected by a reflecting surface RS of the beam splitter BS to travel toward the TAG lens 170 (e.g., as described above, some portion of the light may also be selected to continue upwardly to the monitoring portion 185 if included in the configuration).

In various implementations, the monitoring portion 185 receives the portion of the workpiece light 155 that travels from the field lens 150 up through the beam splitter BS, and for which the monitoring portion may be utilized for monitoring functions (e.g., monitoring or coarse tracking autofocus or traceability reference, etc.). For example, the monitoring portion 185 may include one or more sensors (e.g., autofocus detector, photodiode(s), etc.) that output an electrical signal having a property (e.g., magnitude, phase) that is indicative of a property (e.g., luminous intensity) of light incident on the one or more sensors, which is used for monitoring.

In various implementations, an illumination source may be at other locations that are different than that illustrated in FIG. 1. For example, an at least partially transparent workpiece 20 could be illuminated with unpolarized or polarized light from below the stage (e.g., from a stage light source). In another example, polarized or unpolarized lighting that is coaxial with the workpiece light can be inserted through a beam splitter (not shown) that would located below the optional half-wave plate HWP and above the objective/field lens(es) 150. In another example, the illumination source 130 may comprise ring lighting that illuminates the workpiece 20 from at least one orientation.

The control system portion 101 may include system manager circuits/routines 125, which may govern an input/output interface 139, and the imaging manager circuits/routines 180. A host system, or various individual display devices or input devices, or the like, may be connected to the input/output interface 139. In some implementations the workpiece stage 110 may comprise an (optional) motion control system 110' that moves the workpiece 20 relative to the optical imaging system 105. For example, the motion control system 110' may include a motor (e.g., coupled to a conveyor belt or other motion mechanism on which the workpiece stage 110 is mounted) and by controlling rotation of the motor, a position of the workpiece stage 110 relative to the field lens 150 may be controlled. In such implementations, the system manager circuits and routines 125 may include a workpiece program generator and executor (not shown), that operates the motion control system 110' and other features of the TAG lens system 10, to automatically inspect the workpiece 20, as disclosed in the incorporated references.

As shown in FIG. 1, the imaging manager circuits/routines 180 includes or governs an illumination control interface 132, a camera control interface 162, and a TAG lens control interface 172. The TAG lens control interface 172 may include or be connected to a TAG lens controller (e.g., in a portion of the imaging manager circuits/routines 180) including circuits and/or routines for controlling various image exposures synchronized with the periodic focus position modulation provided by the TAG lens 170. In some implementations, the TAG lens control interface 172 and a TAG lens controller may be merged and/or indistinguishable. The illumination control interface 132 may control, for example, the selection, power, on/off switch, and strobe pulse timing, if applicable, for corresponding illumination sources (e.g., illumination source 130 via a control signal output from the illumination control interface 132 to a signal line 131 that is coupled to the illumination source 130). In some implementations, the illumination control interface 132 may include an exposure (strobe) time controller or may otherwise provide strobe timing signals (e.g., to the illumination source 130), such that they provide an image exposure strobe timing that is synchronized with a desired phase timing of the TAG lens focus position modulation. The camera control interface 162 may control, for example, the camera configuration, exposure timing, and data output and the like, if applicable. In some implementations, the camera control interface 162 may include a timing controller such that the camera image exposure timing is synchronized with a desired phase timing of the TAG lens focus position modulation and/or an illumination timing. Each of these components, as well as the additional components described below, may be interconnected by one or more data/control busses and/or application programming interfaces, or by direct connections between the various elements.

As will be described in more detail below, an imaging optical path comprises various optical components (e.g., the field lens 150, the beam splitter BS, the TAG lens 170, etc.) that convey workpiece imaging light 155 from the workpiece 20 to the image detector 160. For example, in various implementations, as part of the imaging optical path the field lens 150 may have an optical axis OA and may convey the light 155 from the workpiece 20 to the beam splitter BS which conveys the light into the TAG lens 170 for which the mirror 114r reflects the light 155 to pass back out of the TAG lens 170 and pass through the beam splitter BS to the image detector 160. However, it will be appreciated that this implementation is intended to be exemplary only, and not limiting. More generally, the imaging optical path may include other optical elements, and may take any form that is operational for imaging the workpiece 20 using an image detector (e.g., the image detector 160) according to known principles. In the illustrated implementation, the imaging optical path includes the TAG lens 170, and may be utilized for imaging and/or measuring a surface of a workpiece 20 using one or more workpiece image exposures.

As previously outlined, the optical power of the TAG lens 170 changes continuously at a high frequency in response to a resonant drive signal (e.g., as input on a signal line 171 from a TAG lens control interface 172 of the control system portion 101). The effective focus position EFP changes accordingly. In various implementations, the drive signal is a sinusoidal AC signal at a resonant frequency of operation of the TAG lens 170. A focal length Df corresponding to an effective focus position EFP is available at a corresponding time or "phase timing" during the sinusoidally changing the optical power of the TAG lens 170. The nominal or "midrange" effective focus position may be considered to be the (fixed) focal length of the field lens 150 (e.g., an objective lens), in combination with the TAG lens in a state where its optical power is zero.

As noted above, in various implementations the optical power of the TAG lens 170 changes continuously at a high frequency in response to a resonant drive signal (e.g., in some implementations achieving a modulation of the optical power at a TAG lens resonant frequency of 250 kHz, or 70 kHz, or 30 kHz, or the like). In various implementations, the effective focus position EFP of the imaging system 105 (that is, the focus position in front of the field lens 150) may be rapidly moved within a range Refp (e.g., an autofocus search range, or a general focus range, etc.) bound by an effective focus position EFP1 (or maximum effective focus position) corresponding to a maximum optical power of the TAG lens 170 in combination with the field lens 150 (e.g., an objective lens), and an effective focus position EFP2 (or minimum effective focus position) corresponding to a maximum negative optical power of the TAG lens 170 in combination with the field lens 150. In various implementations, the effective focus positions EFP1 and EFP2 may approximately correspond to phase timings of 90 degrees and 270 degrees, respectively. For purposes of discussion, the middle of the range Refp may be designated as a nominal effective focus position, and may correspond to zero optical power of the TAG lens 170 in combination with the nominal optical power of the field lens 150. According to this description, the nominal effective focus position may approximately correspond to the nominal focal length of the field lens 150 in some implementations (e.g., which may correspond to a working distance WD of the field lens 150).

In various implementations, the illumination source 130 or the image detector 160 may be "strobed" (e.g., as controlled by the illumination control interface 132, the camera control interface 162 and/or the imaging manager circuits/routines 180) at a particular phase or "phase timing" of the resonant cycle to obtain an image exposure focused at a corresponding effective focus position or focus distance. The source light 134 is reflected or transmitted as workpiece light 155, and the workpiece light used for imaging passes through the field lens 150 and the TAG lens 170 and is gathered by the image detector 160 (e.g., a camera). A workpiece image exposure which includes the image of the workpiece 20 is captured by the image detector 160, and is output on a signal line 161 to the imaging manager circuit/routines 180 (e.g., through a camera control interface 162). In various implementations, the image detector 160 may be a known charge coupled device (CCD) image sensor or other form of camera, and may receive an incident image IMG and may output to the imaging manager circuit/routines 180 a detected image DIMG having a predetermined signal form. With respect to the phase timings, it is noted with respect to the configurations disclosed herein that the first and second passes of the light through the operational volume of the refractive fluid of the TAG lens may take slightly longer as compared to a configuration with only a single pass through the operational volume of the refractive fluid of the TAG lens, although will occur rapidly enough to continue to correspond to a given phase timing of the resonant cycle to obtain an image exposure focused at a corresponding effective focus position or focus distance.

Known contrast-based focus analysis methods may be used to analyze the resulting image(s) and determine whether they are in focus, and/or may be used in the system manager circuits and routines 125 or the imaging manager circuits/routines 180 to adjust the strobe phase timing to provide an "autofocus" operation that provides a focused image of the workpiece 20. Alternatively, or in addition, such contrast-based focus analysis methods may be used to identify a best-focus image out of a set of images acquired at a corresponding set of known phase timings, and output that "best-focus" phase timing value. Z-height (effective focus position) calibration data may be utilized that relates respective Z-heights or effective focus positions to respective "best-focus" phase timings. Thus, the surface height coordinate of an imaged surface portion of a workpiece 20 may be determined based on the phase timing associated with its "best focus" image. Therefore, the optical imaging system 105 and/or the TAG lens system 10 may be used to measure or profile the workpiece 20 by scanning across it, if desired. Various aspects of such measuring processes are described in greater detail in the incorporated references.

FIG. 2 is a diagram of a cross section of a TAG lens 170' including certain features that are included in the TAG lens 170 shown in FIG. 1. The TAG lens 170' includes a lens casing 210 comprising a case end portion 210A (also referred to as a case end portion CEPt), and a combined case wall/case end portion 210B. As shown in FIG. 2, the combined case wall/case end portion 210B comprises a case end portion CEPb and a case wall portion CWP. The case end portion CEPb includes an exterior surface 216b. The lens casing 210 surrounds the casing cavity CC. The TAG lens 170' further includes a controllable acoustic wave generating element 220, and a refractive fluid 250. As illustrated in FIG. 2, a casing cavity CC of the lens casing 210 includes an operational volume OPV of the refractive fluid 250, and the acoustic wave generating element 220 (e.g., a piezoelectric vibrator) is arranged inside the lens casing 210 around an optical path OPATH that passes through the operational volume OPV. In various implementations (e.g., as illustrated herein) the lens casing 210 may be a hollow cylindrical case, and the controllable acoustic wave generating element 220 may be a hollow cylindrical piezoelectric vibrator that is installed on the interior of the lens casing 210.

According to a convention used herein, the suffix "t" generally indicates a feature of the "top" case end portion CEPt, and the suffix "b" generally indicates a feature of the "bottom" case end portion CEPb. It will be appreciated that the use of "top" and "bottom" is only for convenient reference to distinguish one case end portion from the other in the various descriptions herein. Generally speaking, a TAG lens may be used in an inverted or rotated position if desired.

In various alternative implementations, the lens casing 210 may have other shapes (e.g., a hollow hexagonal shape, or square shape, etc.). In various implementations, the controllable acoustic wave generating element 220 may be supported by spacers 260, 261 and 262 (e.g., O-rings used only for mechanical support, made of an elastomer, etc.). In various implementations, one or more spacers 260 may be disposed between an outer circumferential surface 230 of the controllable acoustic wave generating element 220 and an inner circumferential cavity wall 215 of the lens casing 210 (e.g., forming a spacing SP1). Similarly, one or more spacers 261 may be disposed between an upper surface 231 of the controllable acoustic wave generating element 220 and an upper inner surface 217t of the lens casing 210 (e.g., forming a spacing SP2), and one or more spacers 262 may be disposed between a lower surface 232 of the controllable acoustic wave generating element 220 and a lower inner surface 217b of the lens casing 210 (e.g., forming a spacing SP3).

In various implementations, the controllable acoustic wave generating element 220 vibrates in a radial direction due to a drive signal (e.g., an AC voltage that is applied between the outer circumferential surface 230 and the inner circumferential surface 240). In various implementations, the drive signal is applied through a signal line (e.g., signal line 171 of FIG. 1, as provided from the TAG lens control interface 172 of the control system portion 101) and through the electrical connector 225 to the acoustic wave generating element 220.

In various implementations, the drive signal (e.g., comprising an AC voltage) that is provided on the signal line 171 may be adjusted to a resonant frequency that produces a standing acoustic wave W in the refractive fluid 250 on the inner side of the controllable acoustic wave generating element 220 (i.e., within the portion of the casing cavity that is surrounded by the inner circumferential surface 240). In such a case, when the controllable acoustic wave generating element 220 is vibrated as indicated by representative vibration arrows VA (only one of which is labeled in FIG. 2), a standing acoustic wave W arises in the refractive fluid 250 (i.e., and concentric circular wave regions arise where the refractive index increase and decreases). It will be understood that the standing acoustic wave W produces a density gradient that provides a refractive index distribution corresponding approximately to the standing acoustic wave W. The central portion of that refractive index distribution, represented as the optical path OPATH between the vertical dashed lines, may be used for imaging.

As noted above, the casing cavity CC (e.g., as formed by the inner circumferential cavity wall 215 and the inner surfaces 217t and 217b) is filled with the refractive fluid 250. In various implementations, the refractive fluid 250 may be added to the casing cavity CC through one or more inlet/outlet ports (e.g., including an inlet/outlet port 211), which are then sealed. In various implementations, under desired operating conditions, the entire controllable acoustic wave generating element 220 is immersed in the refractive fluid 250, such that the cavity within the hollow cylindrical controllable acoustic wave generating element 220 (i.e., as surrounded by the inner circumferential surface 240) is filled with the refractive fluid 250. The vertical slots or channels 219 and radial slots or channels 218 in the lens casing 210 allow the refractive fluid 250 to flow past the various spacers (e.g., O-rings) to surround the outer circumferential surface 230 of the acoustic wave generating element 220 during and after filling. In contrast to the spacing SP1, which extends around the entire outer circumference of the acoustic wave generating element 220, it will be appreciated that the radial and vertical channels 218 and 219 are discrete channels (e.g., horizontal and vertical slots formed by drilling or other processes in the lens casing 210). The refractive fluid 250 is able to flow from the cavity within the inner circumferential surface 240 into the radial channel(s) 218 and through the spacings SP (e.g., spacings SP1 and SP3) produced by the spacers (e.g., spacers 260 and 262) and into the vertical channel(s) 219. In this manner, the refractive fluid 250 is also able to fill the spacings SP1, SP2 and SP3 between the acoustic wave generating element 220 and the inner circumferential cavity wall 215 and the upper and lower inner surfaces 217t and 217b of the casing cavity CC of the lens casing 210, so as to surround the outside of the acoustic wave generating element 220.

The TAG lens 170' also includes top and bottom components 214t and 214b (e.g., one as a window and one as a mirror), that are disposed at upper and lower portions of the casing cavity CC, respectively, and sealed against it. In certain examples described below, the component 214t is designated as a window (e.g., similar to window 114w of FIG. 1) and the component 214b is designated as a mirror (e.g., similar to mirror 114r of FIG. 1). In such a configuration, the optical path OPATH that passes through a center of the TAG lens 170' (e.g., as centered along the optical axis OA) passes through the window 214t and includes the mirror 214b which reflects the light (e.g., similar to the operations described above with respect to FIG. 1). However, it will be appreciated that in various alternative implementations, the component 214t may be a mirror and the component 214b may be a window, for which the orientation of the TAG lens 170' would be reversed in the configuration of FIG. 1, with the component 214b corresponding to the window 114w and the component 214t corresponding to the mirror 114r of FIG. 1. In various implementations, the mirror (i.e., either as the component 214b or 214b) may be a front face or a back face mirror. A back face mirror may include a glass portion on the front (i.e., facing the interior of the TAG lens 170') with a reflective coating or other reflective surface (e.g., an index matching coating) on the back. A front face mirror may include a reflective coating or other reflective surface on the front (i.e., facing the interior of the TAG lens 170') and may eliminate light from passing twice through a glass portion of the mirror (i.e., as may occur in a back face mirror with a possible extra Fresnel reflection off the front glass surface).

It should be appreciated that the resonant frequency outlined previously is a property of the overall system. As described in more detail in copending and commonly assigned U.S. Patent Publication No. 20190369300, entitled "External Reservoir Configuration For Tunable Acoustic Gradient Lens", filed on Jun. 5, 2018, (hereinafter the '300 application), which is hereby incorporated herein by reference in its entirety, the resonant frequency may be sensitive to variations in factors such as temperature, and/or pressure, and/or mechanical stresses. The lensing characteristics of the resulting standing acoustic wave W may similarly be sensitive to variations in such factors. The various principles and configurations disclosed in the '300 application are directed to reducing variations in the driving factors noted above, as well as to reducing variations due to movement and/or inadequacy of a previously known and used type of compressible element IGV/ICE, or the like.

Regarding the compressible element IGV/ICE, one configuration is represented in FIG. 2 by dashed outlines which represent an approximate cross section of an annular compressible element intended to be constrained in a corresponding annular recess. The annular compressible element IGV/ICE has been known to be an intentional gas volume, or a closed-cell foam element, or the like. It should be emphasized that the annular recess illustrated as corresponding to the annular compressible element IGV/ICE has been known to have dimensions based only on the dimensions thought to be desirable for the compressible element IGV/ICE. In general, known annular compressible elements IGV/ICE have been inadequate to their intended purpose, as disclosed in the '300 application, and therefore their dimensions have had no specific range of values or justification. Accordingly, the annular recess illustrated as corresponding to the annular compressible element IGV/ICE as illustrated in FIG. 2 is only a schematic representation for purposes of explanation (e.g., according to the explanation disclosed in the '300 application.) Likewise, the dimensions of the recess shown in the surface 216t of the case end portion CEPt shown in FIG. 2 have had no specific range of values or justification. One purpose of such a recess has been to make the fluid filling of the casing cavity CC through the inlet/outlet port 211 easier and/or neater. Accordingly, the recess illustrated shown in the surface 216t of the case end portion CEPt in FIG. 2 is only a schematic representation.

As described in the '300 application, in order to achieve an improved configuration which also eliminates and supersedes the annular compressible element IGV/ICE and its corresponding annular recess, the casing cavity CC may be connected by a flow channel to an external reservoir configuration which includes a deformable external fluid reservoir that contains a reserve volume of the refractive fluid 250. The flow channel enables the refractive fluid 250 to flow back and forth between the casing cavity CC and the deformable external fluid reservoir in accordance with expansion and contraction of the refractive fluid (e.g., due to changes in temperature), which has certain advantages for addressing various issues as described in the '300 application.

In various implementations, compression of the refractive fluid 250 is able to be achieved in accordance with the acoustic wave generating element 220 vibrating with a displacement along its length along the optical axis OA. The lens casing 210 acts to contain the refractive fluid 250, hold the acoustic wave generating element 220 aligned with the optical axis OA, and provide a structure for mounting the TAG lens 170 into an optical system (e.g., in which the lens casing 210, and in particular case end portions CEP, may be clamped and/or otherwise attached to supporting structures or other components in an optical system, etc.). The acoustic wave generating element 220 is mechanically coupled to the lens casing 210 by both the refractive fluid 250 and the spacers 260, 261 and 262 (e.g., O-rings used for mechanical support, made of an elastomer, etc.) that are positioned along the side and top and bottom edges of the acoustic wave generating element 220. In various implementations, in order for the acoustic wave generating element 220 to achieve large displacements, it may be desirable for the lens casing 210 to vibrate and/or deflect in a mode or manner that supports the motion of the acoustic wave generating element 220 in compressing the refractive fluid 250 along the optical axis OA.

FIG. 2 shows a mounting surface MSt which extends around the periphery of a case end portion CEPt on its associated case end rim portion CERt (except on the vicinity of the electrical connector 225 and its associated cover.) FIG. 2 also shows a mounting surface MSb which extends around the periphery of the case end portion CEPb on its associated case end rim portion CERb. In various implementations, a TAG lens may include either or both such mounting surfaces. The mounting surface MSt (or MSb) may be configured to receive a mounting element that that exerts force on the mounting surface MSt (or MSb) along the radial direction (e.g., a compressive mounting clamp that interfaces to the mounting surface).

It will be understood that if such a mounting element is used for mounting the TAG lens 170 into the optical system and if the mounting element is local to the mirror element (e.g., mirror 214b, with the mounting to the mounting surface MSb)), that the mounting may effectively stabilize the mirror (e.g., reducing some of the vibration of the mirror in an axial direction). In some instances where the light is in the form of a beam (e.g., a laser), this may minimize or reduce phase changes to the beam. Alternatively, if the mounting is to the other end of the lens (e.g., with the mounting to the mounting surface MSt), this may allow the mirror to have larger vibrations, which may add a phase delay or increase phase changes to the beam. In various implementations, such phase delays or phase changes may be utilized for certain applications (e.g., wherein the TAG lens system may operate at least in part as an electro-optical modulator to change a phase of a beam quickly, or for otherwise adding modulation to sensors, such as image stacking systems in combination with fast FPGA processing to increase resolution and/or decrease noise, etc.)

Figure 3B:
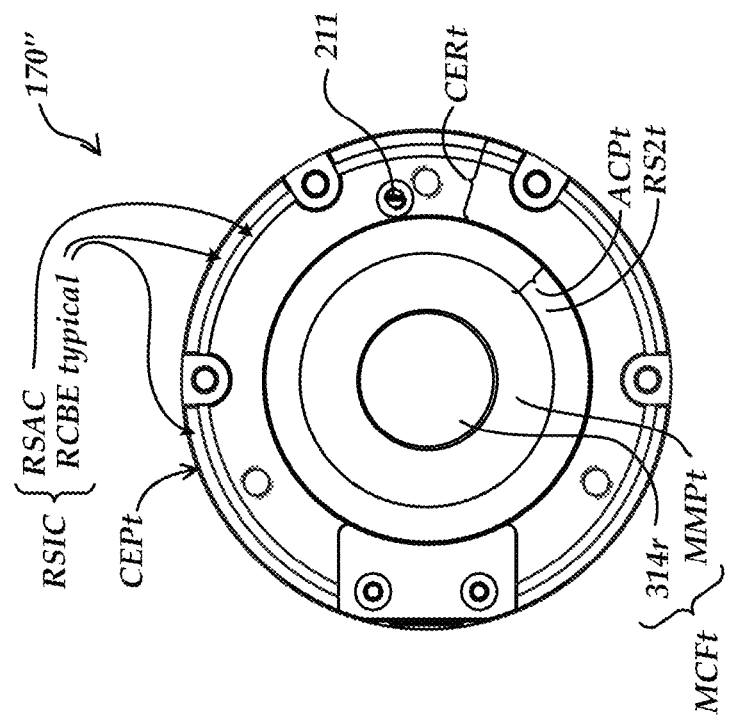
FIGS. 3A and 3B are diagrams of isometric and top views of a TAG lens similar to that shown in FIG. 1.
Figure 3A:
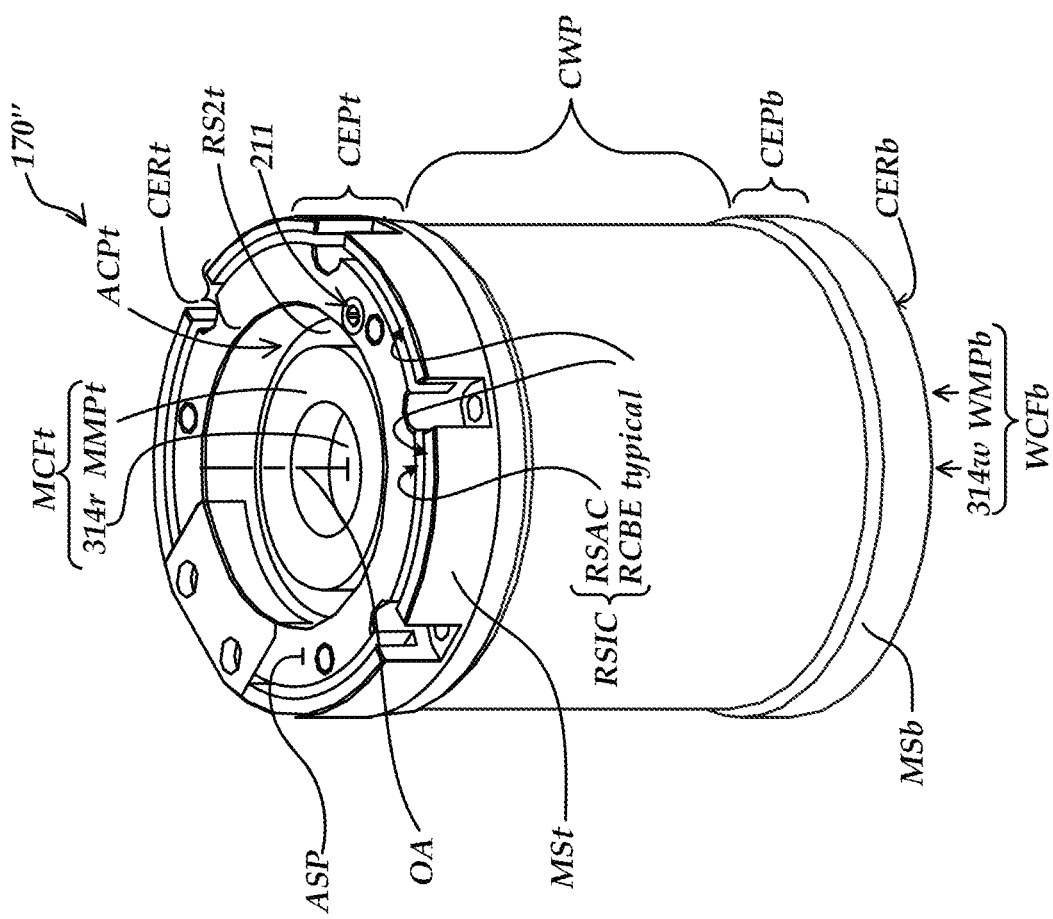

FIGS. 3A and 3B are diagrams of isometric and top views of a TAG lens 170" that may be substantially similar or identical to the TAG lens 170 shown in FIG. 1 and/or the TAG lens 170' shown in FIG. 2 and which may be understood in part based on disclosure included in the previously incorporated '300 application.

As will be described in more detail below, in various implementations it may be desirable for a central portion (e.g., a mirror configuration and/or a window configuration) of either or both case end portion(s) CEP to deflect slightly along the axial direction in response to motion of the acoustic wave generating element 220 and the associated fluid pressures, so that instead of acting as a stiff resistance to the motion of the acoustic wave generating element 220, the mirror and/or window configuration may move slightly (e.g., with an enhanced axial deflection on the order of tens to hundreds of nanometers) in cooperation with the motion of the acoustic wave generating element 220 (e.g., so as to reinforce the motion/vibration and increase the overall amplitude of the motion/vibration of the acoustic wave generating element 220). In various implementations, such motion and corresponding effects may be enabled/increased/enhanced by inclusion of an axial compliance portion in either, or preferably both, of the case end portions CEPt and CEPb. Related features for certain window configurations are also described in copending and commonly assigned U.S. patent application Ser. No. 16/227,561, entitled "Tunable Acoustic Gradient Lens With Axial Compliance Portion", filed on Dec. 20, 2018, (hereinafter the '516 application), which is hereby incorporated herein by reference in its entirety.

As shown in FIGS. 3A and 3B, the TAG lens 170" includes an enhanced axial compliance portion ACPt in the case end portion CEPt (and for which there may also be an enhanced axial compliance portion in the case end portion CEPb), as described in greater detail below. The TAG lenses illustrated herein may have a generally cylindrical shape, and many of the features outlined below may be understood to be illustrated as cross sections of partially or completely annular regions.

The lens casing comprises a case wall portion CWP that extends generally along the axial direction and top and bottom case end portions CEPt and CEPb that extend generally transverse to the axial direction. The top case end portion CEPt comprises a centrally located mirror configuration MCFt comprising a mirror 314r mounted along the optical path OPATH in a mirror mounting portion MMPt (approximately corresponding the indicated bracket), and a case end rim portion CERt (approximately corresponding to the indicated brackets) that is at least partially aligned with and sealed to the case wall portion CWP, e.g., by fastening and sealing at the joint therebetween according to known methods. Similarly, the bottom case end portion CEPb comprises a centrally located window configuration WCFb comprising a window 314w mounted along the optical path OPATH in a window mounting portion WMPb (approximately corresponding to the indicated bracket), and a case end rim portion CERb (approximately corresponding to the indicated brackets) that is at least partially aligned with and sealed to the case wall portion CWP, e.g., by being integrally formed with and connected to the case wall portion CWP.

The mirror mounting portion MMPt has a respective overall mirror mount axial dimension defined between two parallel mirror mount boundary planes that are perpendicular to the optical axis and that respectively coincide with the furthest interior and exterior surfaces of that mirror mounting portion.

The top case end portion CEPt further comprises a respective enhanced axial compliance portion ACPt (approximately corresponding to the indicated brackets) that is coupled between and sealed to its associated mirror mounting portion MMPt and case end rim portion CERt (e.g., by being integrally formed therewith, as illustrated) and holds its associated mirror mounting portion MMPt in place and is configured to enhance an axial direction deflection amplitude of its associated mirror mounting portion MMPt relative to its associated case rim end portion CERt when the periodic drive signal is applied to the acoustic wave generating element 220.

As shown in FIGS. 3A and 3B, the enhanced axial compliance portion ACPt in the case end portion CEPt further includes a recessed surface RS2t located in an exterior surface of the case end portion CEPt. The recessed surface RS2t is recessed along the axial direction relative to an adjacent surface of its associated case end portion, and extends around its associated mirror mounting portion MMPt over a subtended angle of at least 270 degrees around the optical axis. In some implementations, it may be desirable if the recessed surface RS2t extends over a subtended angle of 360 degrees around the optical axis.

In various implementations, in addition to its function in the enhanced radial compliance portion ACPt, the recessed surface RS2t located in an exterior surface of the case end portion CEPt as shown in FIGS. 3A and 3B may have a second function, wherein it acts as a radial strain isolation configuration RSIC that is located along the radial direction between the case end rim portion CERt (which includes the mounting surface MSt) and a first reduced thickness region of the enhanced axial compliance portion ACPt. According to one type of explanation or description, the groove or channel associated with the recessed surface RS2t may be considered a radial strain accommodation channel RSAC that allows minute strain (e.g., radial deflections or "rolling") of the adjacent case end rim portion CERt to be at least partially accommodated or isolated, such that the strain that would otherwise be transmitted to stress or distort the relatively compliant enhanced radial compliance portion ACPt, or other structures of the case end portion CEPt that are radially interior to the radial strain accommodation channel RSAC, is significantly reduced. This results in more stable operation of the TAG lens 170", and is synergistic with the use of the enhanced axial compliance portion ACPt. The case end portion CEPb may include a similarly configured enhanced radial compliance portion that is included on a recessed surface.

As shown in FIGS. 3A and 3B, the radial strain isolation configuration RISC comprises a radial strain isolation channel RSAC and a radial compliance bending element RCBE that each will be understood to extend over a subtended angle of at least 270 degrees around the optical axis OA. It will be understood that the radial compliance bending element RCBE may comprise a continuous section around the subtended angle in some implementations, or in other implementations it may comprise a set of sections RCBE that extend around the subtended angle as a set. In the illustrated implementation, the annular groove that forms the radial strain accommodation channel RASC is located in the case end rim portion CERt or CERb, and is configured to form an inner wall of the adjacent radial compliance bending element RCBE, which has a generally annular shape or configuration (e.g., as shown in FIGS. 3A and 3B) and has an outer peripheral surface that is the mounting surface MSt or MSb.

With regard to any of the various configurations described herein (e.g., with regard to any of the TAG lenses 170, 170', 170" and 170A-170F of FIGS. 1-4F), in some implementations it may be desirable to tune the mass and stiffness of a mirror and/or window configuration and/or their associated enhanced axial compliance portion(s), along with the rest of the overall TAG lens system, so that the system naturally supports (e.g., resonates with) the motion/vibration of the acoustic wave generating element 220 at a frequency (or frequencies) that is utilized to drive the TAG lens 170. In various implementations, the mirror configuration and/or window configuration and/or the axial compliance portion (s) that supports it/them may be configured have a resonant frequency that may be at least partially responsive to the operating frequency of the TAG lens 170. With regard to such considerations, in various implementations it may be desirable to tune/utilize a size or mass of mirror configuration and/or window configuration (e.g., including the relative size of the mirror and/or window) that interacts with the configuration stiffness of the axial compliance portion so as to achieve a desirable deflection/vibration amplitude of the mirror configuration and/or window configuration along the axial direction (e.g., for a given drive frequency). In various implementations, according to one design method, at least the enhanced axial compliance portion and the mirror configuration and/or window configuration of each case end portion are configured to provide a resonant mode of the TAG lens comprising axial translation of the mirror mounting portion and/or window mounting portion relative to its associated case end rim portion, wherein the resonant bandwidth of that resonant mode, as indicated by the amplitude of the axial translation of the mirror mounting portion and/or window mounting portion relative to its associated case end rim portion, includes the frequency of the periodic drive signal that is applied to the acoustic wave generating element. In general, the implementations disclosed may desirably provide an efficient resonant system that achieves high average displacement/motion/vibration of the acoustic wave generating element 220 (e.g., with minimum input electrical energy, etc.).

Figure 4A:
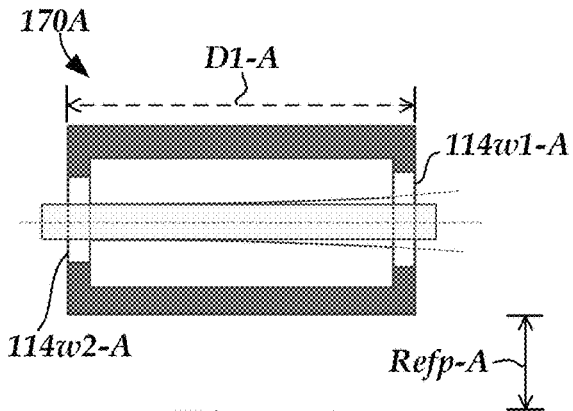
FIGS. 4A through 4F are diagrams for explaining properties of several TAG lenses according to one or more embodiments of the present disclosure.
Figure 4B:
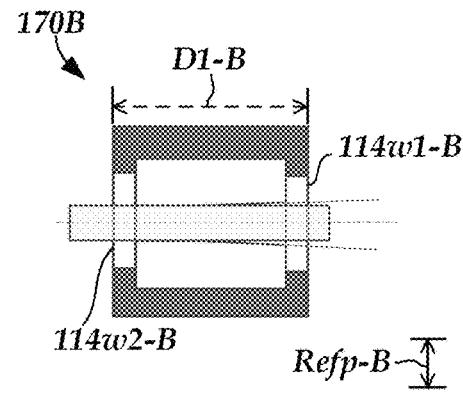
Figure 4C:
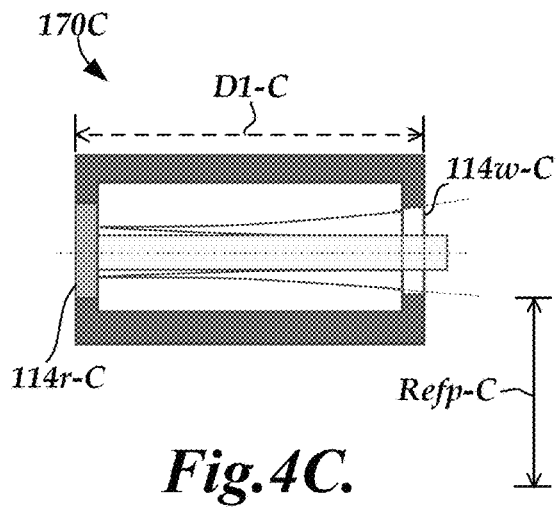
Figure 4D:
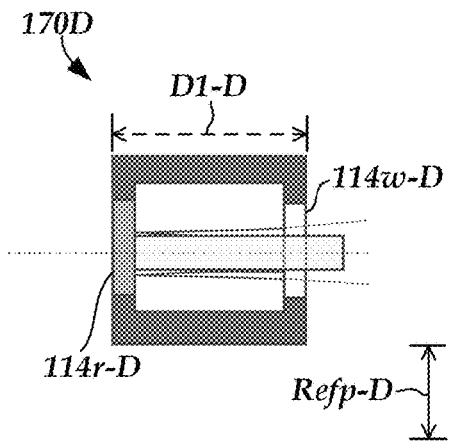
Figure 4E:
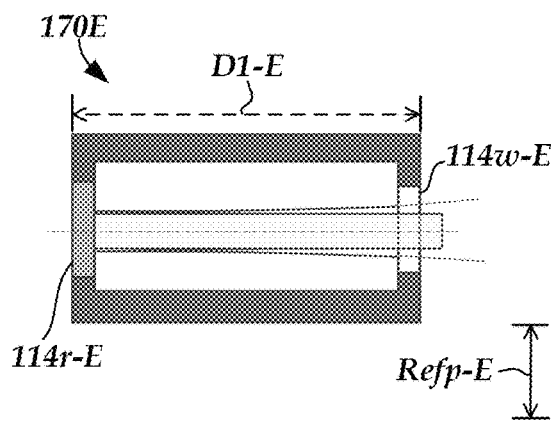
Figure 4F:
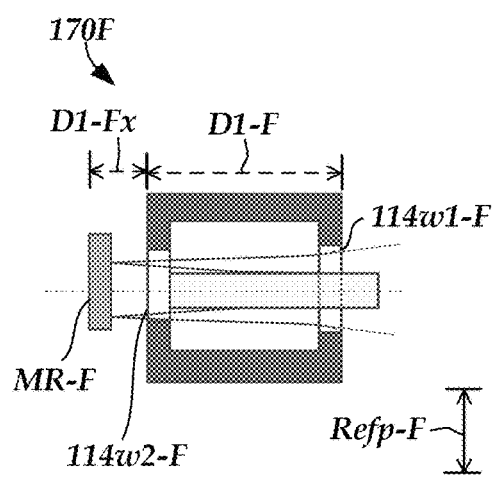

FIGS. 4A through 4F are diagrams for explaining properties of several TAG lenses according to the present disclosure. More particularly, FIG. 4A shows a previously known TAG lens 170A that includes windows 114w1-A and 114w2-A disposed at opposite ends of a casing cavity having a length of D1-A. The TAG lens 170A has a focus range Refp-A (e.g., such as an autofocus search range or general focus range), as described above. FIG. 4B shows a previously known TAG lens 170B that includes windows 114w1-B and 114w2-B disposed at opposite ends of a casing cavity having a length of D1-B. The TAG lens 170B has a focus range Refp-B. FIG. 4C shows a TAG lens 170C in accordance with principles disclosed herein that includes a window 114w-C and a mirror 114r-C disposed at opposite ends of a casing cavity having a length of D1-C. The TAG lens 170C has a focus range Refp-C. FIG. 4D shows a TAG lens 170D in accordance with principles disclosed herein that includes a window 114w-D and a mirror 114r-D disposed at opposite ends of a casing cavity having a length of D1-D. The TAG lens 170D has a focus range Refp-D. FIG. 4E shows a TAG lens 170E in accordance with principles disclosed herein that includes a window 114w-E and a mirror 114r-E disposed at opposite ends of a casing cavity having a length of D1-E. The TAG lens 170E has a focus range Refp-E. FIG. 4F shows a TAG lens 170F in accordance with principles disclosed herein that includes windows 114w1-F and 114w2-F disposed at opposite ends of a casing cavity having a length of D1-F, and also includes a mirror MR-F provided outside of the casing cavity a distance of D1-Fx from the end of the cavity casing that includes the window 114w2-F. The TAG lens 170F has a focus range Refp-F.

In various implementations, the lengths D1-A, D1-C and D1-E are approximately the same, and lengths D1-B, D1-D and D1-F are approximately the same (and approximately ½ of the lengths D1-A, D1-C, and D1-E). The TAG lenses 170A and 170B have a fully transmissive configuration with windows on both ends. An example system/configuration (e.g., similar to that of FIG. 2) that may include a transmissive TAG lens such as TAG lens 170A or 170B is described in U.S. Patent Application Publication No. 2018/0180773 ('773 application), which is hereby incorporated by reference herein in its entirety.

The TAG lens 170B is one-half the size of the TAG lens 170A, and for the same input power may produce approximately one-half the focusing power, in various implementations, as indicated by the resulting focus range Refp-B being about one-half the size of the focus range Refp-A (i.e., with the lenses both utilized in a similar configuration such as that of FIG. 2 and/or the '773 application, such as utilized in combination with a field lens and resulting in the respective range, similar to the range Refp described above with respect to FIG. 1).

The TAG lenses 170C, 170D, and 170E have reflective configurations (i.e., similar to that of FIGS. 1-3B). In various implementations, the TAG lens 170C results in approximately twice the focusing power relative to the TAG lens 170A (for which the focus range Refp-C is approximately twice the focus range Refp-A).

The TAG lens 170D is one-half the size of TAG lens 170C, and thus may have approximately one-half the focusing power (for which the focus range Refp-D may be approximately one-half the focus range Refp-C), but may also have approximately the same focusing power/focus range Refp as the TAG lens 170A, at one-half the size. This example illustrates how a reflective configuration as disclosed herein may allow an approximately one-half sized TAG lens to be utilized in place of a full sized transmissive TAG lens (e.g., which can be beneficial for reducing the overall size of the metrology system and/or various components).

The TAG lens 170E is the same as the TAG lens 170C, except the TAG lens 170E is in a configuration where lower input power is provided (e.g., one-half the input power), with approximately the same output focusing power as the TAG lens 170A in which full input power is utilized (for which the focus range Refp-E is approximately the same as the focus range Refp-A). The ability to utilize lower input power while achieving the same focus range has various advantages (e.g., helping reduce aberrations and resulting in a better quality beam, etc.)

The TAG lens 170F is in an external reflective configuration, with the mirror MR-F located outside of the TAG lens 170F. The TAG lens 170F may have certain advantages over the TAG lens 170B (e.g., if configured properly may result in up to approximately twice the focusing power relative to the TAG lens 170B). However, the TAG lens 170F may also have certain disadvantages, such as adding extra length D1-Fx (e.g., relative to the TAG lens 170D), and the useful aperture may become more limited (e.g., the extra distance to the mirror MR-F results in light rays diverging more by the time they return to the window 114w1-F, for which the dimensions of the window 114w1-F become more limiting for some of the light rays, etc.

Figure 5:
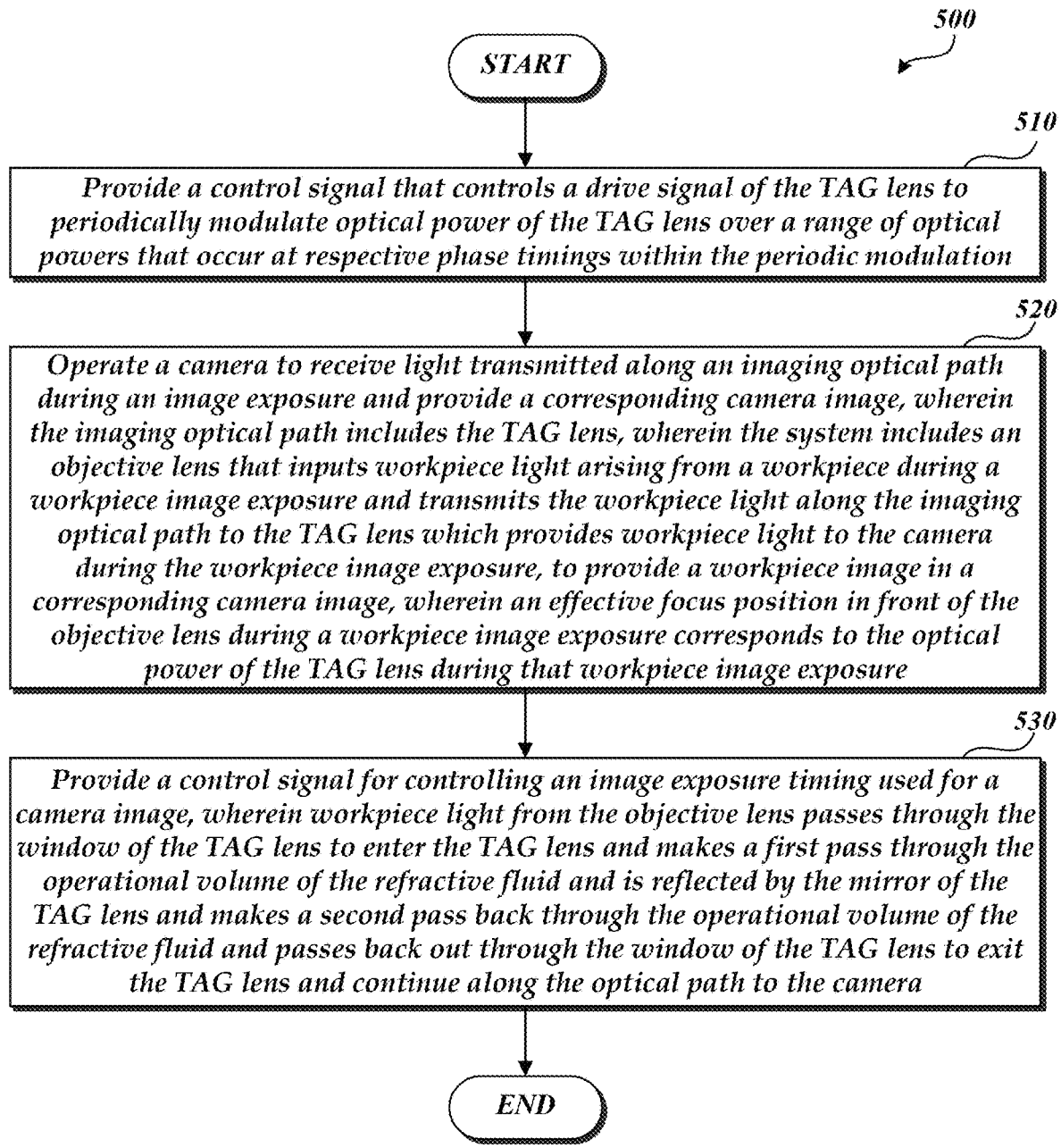
FIG. 5 is flowchart of a method of using a TAG lens with a reflective configuration according to one or more embodiments of the present disclosure.

FIG. 5 is flowchart of a method 500 of using a TAG lens with a reflective configuration according to the present disclosure. The method begins at 510. At 510, a control signal is provided to a TAG lens (e.g., the TAG lens 170 shown in FIG. 1), wherein the control signal controls a drive signal of the TAG lens to periodically modulate optical power of the TAG lens over a range of optical powers that occur at respective phase timings within the periodic modulation. For example, the TAG lens control interface 172 provides the control signal to the TAG lens 170 via the signal line 171. The method 500 then proceeds to 520.

At 520, a camera is operated to receive light transmitted along an imaging optical path during an image exposure and provide a corresponding camera image. The imaging optical path includes the TAG lens. The system includes an objective lens that inputs workpiece light arising from a workpiece during a workpiece image exposure and transmits the workpiece light along the imaging optical path to the TAG lens which provides workpiece light to the camera during the workpiece image exposure, to provide a workpiece image in a corresponding camera image. An effective focus position in front of the objective lens during a workpiece image exposure corresponds to the optical power of the TAG lens during that workpiece image exposure. For example, the illumination source 130 or the image detector 160 may be "strobed" or otherwise controlled (e.g., as controlled by the illumination control interface 132 through the signal line 131, the camera control interface 162 through the signal line 161 and/or the imaging manager circuits/routines 180) at a particular phase or "phase timing" of the resonant cycle of the TAG lens 170 to obtain an image exposure focused at a corresponding effective focus position. The method 500 then proceeds to 530.

At 530, a control signal for controlling an image exposure timing used for a camera image is provided. Workpiece light from the objective lens passes through the window of the TAG lens to enter the TAG lens and makes a first pass through the operational volume of the refractive fluid and is reflected by the mirror of the TAG lens and makes a second pass back through the operational volume of the refractive fluid and passes back out through the window of the TAG lens to exit the TAG lens and continue along the optical path to the camera. For example, the camera control interface 162 provides the control signal to the image detector 160 via the signal line 161. The method 500 then ends.

While preferred implementations of the present disclosure have been illustrated and described, numerous variations in the illustrated and described arrangements of features and sequences of operations will be apparent to one skilled in the art based on this disclosure. For example, it would be apparent to one skilled in the art that similar advantages afforded by a double-pass TAG lens system as disclosed herein could be advantageous in other TAG lens applications, such as a variable focus, high power laser delivery system. In general, various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary, to employ concepts of the various patents and applications to provide yet further implementations.

These and other changes can be made to the implementations in light of the above-detailed description. In general, in the following claims, the terms used should not be construed to limit the claims to the specific implementations disclosed in the specification. Rather, they should be construed to include all possible implementations based on the principles and teachings disclosed herein along with the full scope of equivalents to which such claims are entitled.

The invention claimed is:

1. A tunable acoustic gradient (TAG) lens system comprising:
   a TAG lens;
   a TAG lens control interface that provides a control signal that controls a drive signal of the TAG lens to periodically modulate optical power of the TAG lens over a range of optical powers that occur at respective phase timings within the periodic modulation;
   a camera that receives light transmitted along an imaging optical path during an image exposure and provides a corresponding camera image, wherein the imaging optical path includes the TAG lens; and
   an objective lens that inputs workpiece light arising from a workpiece during a workpiece image exposure and transmits the workpiece light along the imaging optical path to the TAG lens which provides workpiece light to the camera during the workpiece image exposure, to provide a workpiece image in a corresponding camera image, wherein an effective focus position in front of the objective lens during a workpiece image exposure corresponds to the optical power of the TAG lens during that workpiece image exposure;
   wherein the TAG lens comprises:
      a controllable acoustic wave generating element;
      a refractive fluid; and
      a lens casing surrounding a casing cavity, wherein:
         an operational volume of the refractive fluid is contained in the casing cavity and the controllable acoustic wave generating element is arranged inside the lens casing around an optical path that passes through the operational volume, and an axial direction of the TAG lens is defined as parallel to an optical axis of the optical path; and
         the operational volume of the refractive fluid is capable of changing its refractive index along the optical path in response to application of an acoustic wave by the acoustic wave generating element, in accordance with which the TAG lens is controlled to provide a periodically modulated optical power variation for the TAG lens when a periodic drive signal is applied to the acoustic wave generating element; and
         the lens casing comprises:
            a case wall portion that extends generally along the axial direction;
            a first case end portion that extends generally transverse to the axial direction and comprises a centrally located window configuration comprising a window mounted along the optical path in a window mounting portion and a case end rim portion that is at least partially aligned with and sealed to the case wall portion; and
            a second case end portion that extends generally transverse to the axial direction and comprises a centrally located mirror configuration comprising a mirror mounted along the optical path in a mirror mounting portion and a case end rim portion that is at least partially aligned with and sealed to the case wall portion; and
   wherein the TAG lens is configured to enable workpiece light from the objective lens to pass through the window of the TAG lens to enter the TAG lens and make a first pass through the operational volume of the refractive fluid and be reflected by the mirror of the TAG lens and make a second pass back through the operational volume of the refractive fluid and pass back out through the window of the TAG lens to exit the TAG lens and continue along the optical path to the camera.

2. The TAG lens system of claim 1, wherein the modulation of the optical power of the TAG lens results in a range of effective focus positions that occur in front of the objective lens during the modulation, and for which the range is larger due to the first and second passes through the operational volume of the refractive fluid of the TAG lens as compared to a configuration with only a single pass through the operational volume of the refractive fluid of the TAG lens.

3. The TAG lens system of claim 2, wherein the range is bound by a maximum effective focus position and a minimum effective focus position and for which the maximum effective focus position is closer to the objective lens and the minimum effective focus position is further from the objective lens due to the first and second passes through the operational volume of the refractive fluid of the TAG lens as compared to a configuration with only a single pass through the operational volume of the refractive fluid of the TAG lens.

4. The TAG lens system of claim 1, further comprising:
   a beam splitter arranged in the optical path between the objective lens and the TAG lens, wherein the beam splitter includes a reflecting surface and at least some of the workpiece light is directed toward the TAG lens by the beam splitter.

5. The TAG lens system of claim 4, further comprising:
   a monitoring portion that receives a portion of the workpiece light that travels from the objective lens through the beam splitter BS, wherein the monitoring portion outputs a signal indicative of a property of the portion of the workpiece light that is received by the monitoring portion.

6. The TAG lens system of claim 5, further comprising:
   a quarter-wave plate arranged in the optical path between the beam splitter and the TAG lens, wherein the beam splitter is a polarizing beam splitter, and the quarter-wave plate alters a polarization state of the at least some of the workpiece light that is directed toward the TAG lens by the beam splitter.

7. The TAG lens system of claim 6, further comprising:
   a polarized light source that emits a beam of light that returns from the workpiece resulting in the workpiece light, wherein the workpiece light is polarized.

8. The TAG lens system of claim 7, further comprising:
   a half-wave plate arranged in the optical path between the objective lens and the beam splitter, wherein the half-wave plate shifts a polarization direction of the workpiece light from the objective lens.

9. The TAG lens system of claim 6, wherein an amount of the at least some of the workpiece light that is directed toward the TAG lens by the polarizing beam splitter is greater than an amount of the portion of the workpiece light that is received by the monitoring portion.

10. The TAG lens system of claim 1, wherein the lens casing includes a mounting surface for mounting the TAG lens in the TAG lens system that is proximate to the mirror.

11. The TAG lens system of claim 1, wherein the lens casing includes a mounting surface for mounting the TAG lens in the TAG lens system that is proximate to the window.

12. The TAG lens system of claim 11, wherein the workpiece light is in a form of a beam and the TAG lens, in operation, adds a phase delay to the beam through the reflection from the mirror of the TAG lens.

13. The TAG lens system of claim 1, further comprising:
an illumination control interface which provides a control signal for controlling one or more of a power level and an illumination timing of an illumination source that outputs light, wherein at least some of the light output by the illumination source is returned from the workpiece resulting in the workpiece light.

14. The TAG lens system of claim 1, further comprising;
a motion control system that moves the workpiece relative to the optical imaging system.

15. A method for operating a tunable acoustic gradient (TAG) lens system which includes a TAG lens, the method comprising:
providing a control signal that controls a drive signal of the TAG lens to periodically modulate optical power of the TAG lens over a range of optical powers that occur at respective phase timings within the periodic modulation;
operating a camera to receive light transmitted along an imaging optical path during an image exposure and provide a corresponding camera image, wherein the imaging optical path includes the TAG lens, wherein the system includes an objective lens that inputs workpiece light arising from a workpiece during a workpiece image exposure and transmits the workpiece light along the imaging optical path to the TAG lens which provides workpiece light to the camera during the workpiece image exposure, to provide a workpiece image in a corresponding camera image, wherein an effective focus position in front of the objective lens during a workpiece image exposure corresponds to the optical power of the TAG lens during that workpiece image exposure; and
providing a control signal for controlling an image exposure timing used for a camera image,
wherein the TAG lens comprises:
a controllable acoustic wave generating element;
a refractive fluid; and
a lens casing surrounding a casing cavity, wherein:
an operational volume of the refractive fluid is contained in the casing cavity and the controllable acoustic wave generating element is arranged inside the lens casing around an optical path that passes through the operational volume, and an axial direction of the TAG lens is defined as parallel to an optical axis of the optical path; and
the operational volume of the refractive fluid is capable of changing its refractive index along the optical path in response to application of an acoustic wave by the acoustic wave generating element, in accordance with which the TAG lens is controlled to provide a periodically modulated optical power variation for the TAG lens when a periodic drive signal is applied to the acoustic wave generating element; and
the lens casing comprises:
a case wall portion that extends generally along the axial direction;
a first case end portion that extends generally transverse to the axial direction and comprises a centrally located window configuration comprising a window mounted along the optical path in a window mounting portion and a case end rim portion that is at least partially aligned with and sealed to the case wall portion; and
a second case end portion that extends generally transverse to the axial direction and comprises a centrally located mirror configuration comprising a mirror mounted along the optical path in a mirror mounting portion and a case end rim portion that is at least partially aligned with and sealed to the case wall portion; and
wherein workpiece light from the objective lens passes through the window of the TAG lens to enter the TAG lens and makes a first pass through the operational volume of the refractive fluid and is reflected by the mirror of the TAG lens and makes a second pass back through the operational volume of the refractive fluid and passes back out through the window of the TAG lens to exit the TAG lens and continue along the optical path to the camera.

16. The method of claim 15, further comprising:
providing a control signal for controlling one or more of a power level and an illumination timing of an illumination source that outputs light, wherein at least some of the light output by the illumination source is returned from the workpiece resulting in the workpiece light.

17. A tunable acoustic gradient (TAG) lens comprising:
a controllable acoustic wave generating element;
a refractive fluid; and
a lens casing surrounding a casing cavity, wherein:
an operational volume of the refractive fluid is contained in the casing cavity and the controllable acoustic wave generating element is arranged inside the lens casing around an optical path that passes through the operational volume, and an axial direction of the TAG lens is defined as parallel to an optical axis of the optical path; and
the operational volume of the refractive fluid is capable of changing its refractive index along the optical path in response to application of an acoustic wave by the acoustic wave generating element, in accordance with which the TAG lens is controlled to provide a periodically modulated optical power variation for the TAG lens when a periodic drive signal is applied to the acoustic wave generating element; and
the lens casing comprises:
a case wall portion that extends generally along the axial direction;
a first case end portion that extends generally transverse to the axial direction and comprises a centrally located window configuration comprising a window mounted along the optical path in a window mounting portion and a case end rim portion that is at least partially aligned with and sealed to the case wall portion; and
a second case end portion that extends generally transverse to the axial direction and comprises a centrally located mirror configuration comprising a mirror mounted along the optical path in a mirror mounting portion and a case end rim portion that is at least partially aligned with and sealed to the case wall portion,
wherein the TAG lens is configured to enable light to pass through the window of the TAG lens to enter the TAG lens and make a first pass through the operational volume of the refractive fluid and be reflected by the mirror of the TAG lens and make a second pass back through the operational volume of the refractive fluid and pass back out through the window of the TAG lens to exit the TAG lens and continue along the optical path.

18. The TAG lens of claim 17, wherein the modulation of the optical power of the TAG lens results in a range of effective focus positions during the modulation, and for which the range is larger due to the first and second passes through the operational volume of the refractive fluid of the TAG lens as compared to a configuration with a TAG lens of the same size but only utilizing a single pass through the operational volume of the refractive fluid of the TAG lens.

19. The TAG lens of claim 18, wherein the range is bound by a maximum effective focus position and a minimum effective focus position and for which the maximum effective focus position is closer to the TAG lens and the minimum effective focus position is further from the TAG lens due to the first and second passes through the operational volume of the refractive fluid of the TAG lens as compared to a configuration with a TAG lens of the same size but only utilizing a single pass through the operational volume of the refractive fluid of the TAG lens.

20. The TAG lens of claim 17, wherein the TAG lens is included as part of a vision system and control of the TAG lens to provide the periodically modulated optical power variation for the TAG lens correspondingly provides a focus distance variation for the vision system.

* * * * *